US012752760B2

(12) United States Patent
Yoon et al.

(10) Patent No.: US 12,752,760 B2
(45) Date of Patent: Oct. 6, 2026

(54) ELECTRONIC PARKING BRAKE APPARATUS

(71) Applicant: HYUNDAI MOBIS CO., LTD., Seoul (KR)

(72) Inventors: Hyung Suk Yoon, Yongin-si (KR); Jin Woo Choi, Yongin-si (KR); Yong Beom You, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 433 days.

(21) Appl. No.: 18/459,787

(22) Filed: Sep. 1, 2023

(65) Prior Publication Data

US 2024/0208477 A1 Jun. 27, 2024

(30) Foreign Application Priority Data

Dec. 23, 2022 (KR) ........................ 10-2022-0183718

(51) Int. Cl.

| | |
|---|---|
| ***B60T 13/74*** | (2006.01) |
| ***B60T 1/06*** | (2006.01) |
| ***F16D 51/20*** | (2006.01) |
| ***F16D 65/22*** | (2006.01) |
| *F16D 121/24* | (2012.01) |

(52) U.S. Cl.

CPC ............ *B60T 13/741* (2013.01); *B60T 1/067* (2013.01); *F16D 51/20* (2013.01); *F16D 65/22* (2013.01); *F16D 2121/24* (2013.01)

(58) Field of Classification Search

CPC ...... F16D 65/22; F16D 51/20; F16D 2121/24; F16D 2066/001; B60T 13/741; B60T 1/067; B60T 13/745; B60T 17/221

See application file for complete search history.

(56) References Cited

U.S. PATENT DOCUMENTS

| | | | | |
|---|---|---|---|---|
| 7,140,697 | B2 * | 11/2006 | Koga | B60T 7/107 188/162 |
| 7,431,133 | B2 * | 10/2008 | Maron | B60T 7/107 188/162 |
| 7,731,627 | B2 * | 6/2010 | Shimizu | B60T 7/12 477/93 |
| 11,448,275 | B2 * | 9/2022 | Michels | B60T 15/041 |
| 11,787,379 | B2 * | 10/2023 | Ko | F16D 51/24 188/325 |
| 12,344,209 | B2 * | 7/2025 | Park | H02P 6/28 |

(Continued)

*Primary Examiner* — Robert A. Siconolfi
*Assistant Examiner* — James K Hsiao
(74) *Attorney, Agent, or Firm* — NovoTechIP International PLLC

(57) ABSTRACT

An electronic parking brake apparatus is disclosed. An embodiment of the present disclosure provides an electronic parking brake apparatus including a drum; a backing plate located on a side inside the drum; a cylinder attached to a surface of the backing plate; a motor configured to expand or contract the cylinder; a pair of shoes coupled to one side and an other side of the cylinder, respectively, with a lining attached to an outer circumferential surface thereof; a spring located between the pair of shoes and coupled to the pair of shoes; and a control unit configured to control a contraction operation of the cylinder during parking release operation, wherein the control unit determines an end time of the contraction operation.

4 Claims, 7 Drawing Sheets

(56) References Cited

U.S. PATENT DOCUMENTS

| | | | | |
|---|---|---|---|---|
| 2004/0113486 | A1 * | 6/2004 | Koga | B60T 13/66 303/20 |
| 2009/0099748 | A1 * | 4/2009 | Watanabe | B60T 13/746 701/70 |
| 2013/0153349 | A1 * | 6/2013 | Akada | F16D 51/48 188/325 |
| 2013/0282249 | A1 * | 10/2013 | Heise | B60T 13/746 701/70 |
| 2015/0061365 | A1 * | 3/2015 | Sakashita | B60T 13/588 303/15 |
| 2016/0123420 | A1 * | 5/2016 | Shin | F16D 51/28 188/162 |
| 2017/0106848 | A1 * | 4/2017 | Ritter | B60T 13/662 |
| 2022/0185255 | A1 * | 6/2022 | Park | H02P 3/04 |
| 2022/0289162 | A1 * | 9/2022 | Lee | B60T 8/172 |
| 2023/0001894 | A1 * | 1/2023 | Park | F16D 66/00 |
| 2023/0145033 | A1 * | 5/2023 | Park | F16D 65/22 188/72.3 |

* cited by examiner

ELECTRONIC PARKING BRAKE APPARATUS

CROSS-REFERENCE TO RELATED APPLICATIONS

The present application claims priority to Korean Patent Application No. 10-2022-0183718, filed on Dec. 23, 2022, the entire contents of which are incorporated herein by reference.

TECHNICAL FIELD

The present disclosure relates to an electronic parking brake apparatus. More particularly, the present disclosure relates to an electronic parking brake apparatus which sufficiently secures an air gap that is a gap between a drum and a pair of shoes when parking is released, thus preventing a drag phenomenon that may occur between the drum and the pair of shoes.

BACKGROUND

The content described in this section merely provides background information on the present disclosure and does not constitute the prior art.

An electronic parking brake apparatus having a drum structure is operated such that when parking is engaged, a cylinder expands to push a pair of shoes in opposite directions, and consequently, the pair of shoes applies a braking force to the inner circumferential surface of the drum.

In contrast, when parking or parking brake is released, the cylinder and the pair of shoes return to their original positions. That is, the cylinder contracts to start pulling the pair of shoes, and contact between the pair of shoes and the drum is released. When the pair of shoes and the drum change from a contact state to a non-contact state, this is referred to as becoming a no-load state or a no-load point. That is, the no-load state refers to a state where the drum does not contact the pair of shoes.

The end time of parking release or parking brake release is the time when a preset amount of time has elapsed since the no-load state. For example, assuming that the preset amount of time is 1 second, the cylinder contracts for 1 second after the no-load state, and then the cylinder stops contracting after 1 second, and the parking release operation is immediately terminated.

The electronic parking brake apparatus having the drum structure changes its shape while expanding or contracting according to temperature. When a parking brake is applied in a state in which the drum expands by thermal energy, the cylinder expands more as much as the drum expands outward, and consequently, the pair of shoes moves relatively further compared to when they are at room temperature. Therefore, in order for the cylinder and the pair of shoes to return to their original positions at the time of parking release, they should move a relatively longer distance compared to when the parking release operation is performed at room temperature. However, as described above, since the end time of the parking release operation of the prior art is time when the preset amount of time has passed in the no-load state, the parking release operation is terminated even if the cylinder and the shoes do not return to their original positions after the preset amount of time has elapsed.

According to the prior art, since the parking release operation is terminated after operating only for a preset amount of time from the no-load state when parking is released, there occurs a problem that the parking release operation is terminated even when the cylinder does not contract enough to return to its original position. If the cylinder does not contract sufficiently, a drag phenomenon may occur between the drum and the pair of shoes due to the insufficient air gap.

In order to prevent the drag phenomenon, it is necessary to more precisely control a distance that the cylinder contracts so that the cylinder and the pair of shoes may return to their original positions when parking is released.

SUMMARY

Accordingly, the present disclosure aims to address the abovementioned problems, and an objective of the present disclosure is to provide an electronic parking brake apparatus capable of determining the end time of a parking release operation so as to prevent a drag phenomenon by securing a sufficient air gap between a drum and a pair of shoes.

To achieve such objectives, an embodiment of the present disclosure provides an electronic parking brake apparatus including a drum; a backing plate located on a side inside the drum; a cylinder attached to a surface of the backing plate; a motor configured to expand or contract the cylinder; a pair of shoes coupled to one side and an other side of the cylinder, respectively, with a lining attached to an outer circumferential surface thereof; a spring located between the pair of shoes and coupled to the pair of shoes; and a control unit configured to control a contraction operation of the cylinder during parking release operation, wherein the control unit determines an end time of the contraction operation.

As described above, an electronic parking brake apparatus according to an embodiment is advantageous in that a control unit determines the end time of the contraction operation of a cylinder, thus securing a sufficient air gap and preventing a drag phenomenon from occurring between a drum and a pair of shoes.

DETAILED DESCRIPTION

Figure 1:
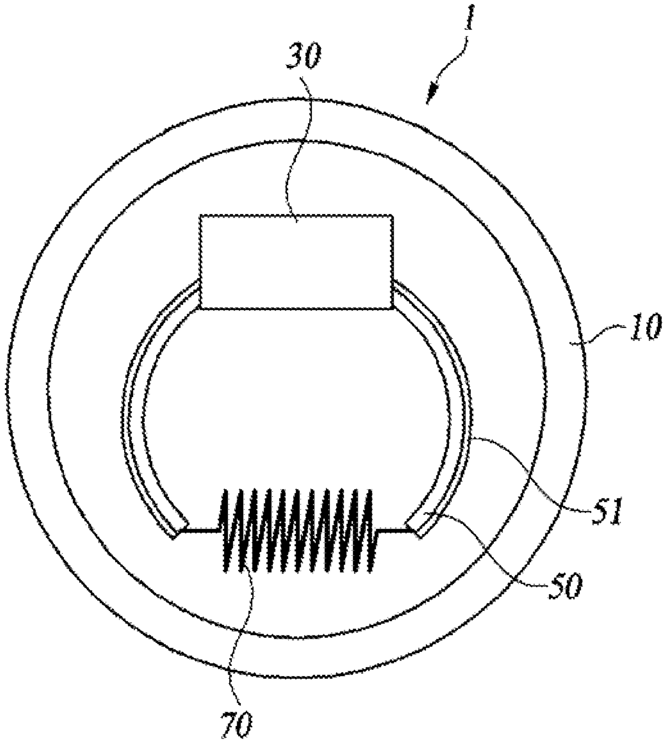
FIG. 1 is a diagram illustrating an electronic parking brake apparatus according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary.

FIG. 1 is a diagram illustrating an electronic parking brake apparatus according to an embodiment of the present disclosure.

Referring to FIG. 1, the electronic parking brake apparatus 1 may include all or some of a drum 10, a backing plate (not shown), a cylinder 30, a motor (not shown), a pair of shoes (or brake shoes) 50, a lining 51, a spring 70, and a control unit (not shown).

The drum 10 is a part rotating with the wheel of a vehicle and has a friction surface on an inner circumferential surface thereof. When parking is engaged, the inner circumferential surface of the drum 10 is pressed by the pair of shoes 50 to generate a braking force.

The backing plate is disposed within (e.g., located on a side inside) the drum 10 so that the cylinder 30, the motor, the shoes, the spring 70, etc. may be attached thereto. The backing plate is fixed to the axle of a vehicle body so as not to be rotated.

The cylinder 30 is attached to a surface of the backing plate, and the pair of shoes 50 is coupled to one side and the other side of the cylinder 30, respectively. The cylinder 30 expands or contracts under the action of the motor.

The motor is a device that expands or contracts the cylinder 30. The motor expands the cylinder 30 when parking is engaged and contracts the cylinder 30 when parking is released.

The pair of shoes 50 is coupled to one side and the other side of the cylinder 30, respectively, and is formed in an arc shape, with the lining 51 being attached to the outer circumferential surface thereof. The pair of shoes 50 is widened in both directions due to the expansion of the cylinder 30 when parking is engaged, thus pressing the inner circumferential surface of the drum 10.

The lining 51 is a friction member attached to the outer circumferential surface of each of the pair of shoes 50, and is a part that applies a braking force by contacting the friction surface of the inner circumferential surface of the drum 10.

The spring 70 is located between the pair of shoes 50 and is coupled at one side and the at the other side to the pair of shoes 50. The spring 70 is compressed when the cylinder 30 expands and is released when the cylinder 30 contracts.

The control unit controls the contraction operation of the cylinder 30 when parking is released and determines the end time for performing a cylinder contraction operation (i.e., the end time for contracting the cylinder 30). The contraction distance S of the cylinder is a value obtained by multiplying the moving speed of the cylinder 30 by the amount of time the contraction operation is performed. If the moving speed of the cylinder 30 has a constant value, the contraction distance S of the cylinder 30 varies according to the time during which the contraction operation is performed. The end time of the contraction operation of the cylinder 30 refers to time when the parking release operation ends. As the end time is delayed, the time the cylinder 30 contracts becomes longer. Since the contraction operation proceeds for a long time, the contraction distance S also increases. The earlier the end time, the shorter the time during which the cylinder 30 contracts. Since the contraction operation is performed for a short time, the contraction distance S also becomes shorter. When the contraction distance S of the cylinder 30 is not sufficient, the drag phenomenon may occur between the drum 10 and the pair of shoes 50 due to the insufficient air gap. The control unit may determine an appropriate contraction distance S of the cylinder 30 to secure the sufficient air gap and may determine the end time of the contraction operation of the cylinder 30 to adjust the time during which the contraction operation of the cylinder 30 is performed.

Figure 2:
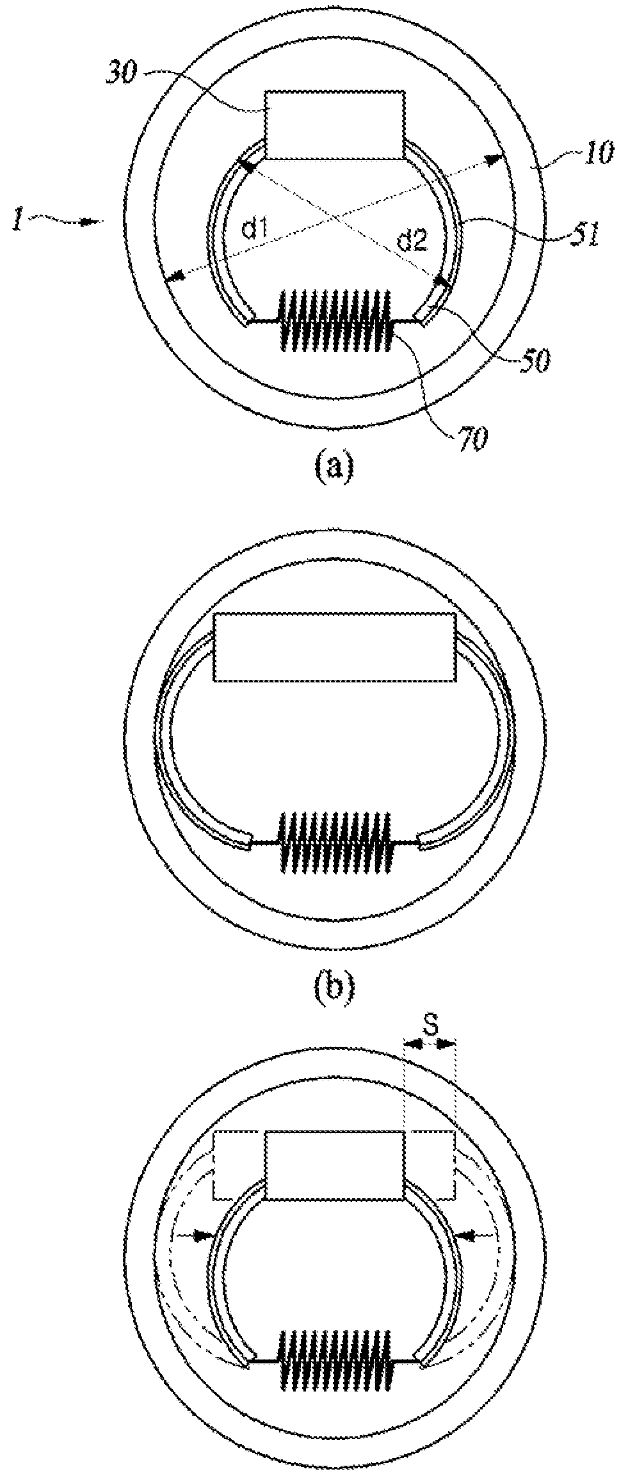
FIG. 2 is a diagram illustrating the parking engagement process and the parking release process of the electronic parking brake apparatus according to an embodiment of the present disclosure.

FIG. 2 is a diagram illustrating the parking engagement process and the parking release process of the electronic parking brake apparatus according to an embodiment of the present disclosure.

Referring to FIG. 2, FIG. 2A shows an initial state before the parking engagement, FIG. 2B shows the parking engagement state, and FIG. 2C shows the parking release state and the contraction distance S of the cylinder 30.

When parking is engaged, the cylinder 30 expands due to the action of the motor, and the cylinder 30 pushes the pair of shoes 50 to both sides. As a result, the pair of shoes 50 contacts the inner circumferential surface of the drum 10 to generate a braking force.

When parking is released, the cylinder 30 contracts due to the action of the motor, and the cylinder 30 pulls the pair of shoes 50. As the pair of shoes 50 moves, the drum 10 and the pair of shoes 50 that were in contact with each other are separated. When the pair of shoes 50 and the drum 10 change from the contact state to the non-contact state is referred to as becoming the no-load state. That is, the no-load state refers to a state in which the drum 10 and the pair of shoes 50 are not in contact. The control unit determines an end time by considering the contraction distance of the cylinder 30 and an operating time during which the contraction operation of the cylinder 30 occurs so that the parking release operation is terminated in a state in which the air gap is sufficiently secured. The cylinder 30 continues the contraction operation until the end time determined by the control unit is reached, and the parking release is terminated at the end time. The contraction distance S of the cylinder 30 is the distance the cylinder 30 contracts while the parking release operation continues due to the action of the motor. Since the drag phenomenon may occur when the contraction distance S of the cylinder 30 is insufficient during parking release, the control unit may appropriately adjust the end time of the contraction operation of the cylinder 30 and the contraction distance S.

Figure 3:
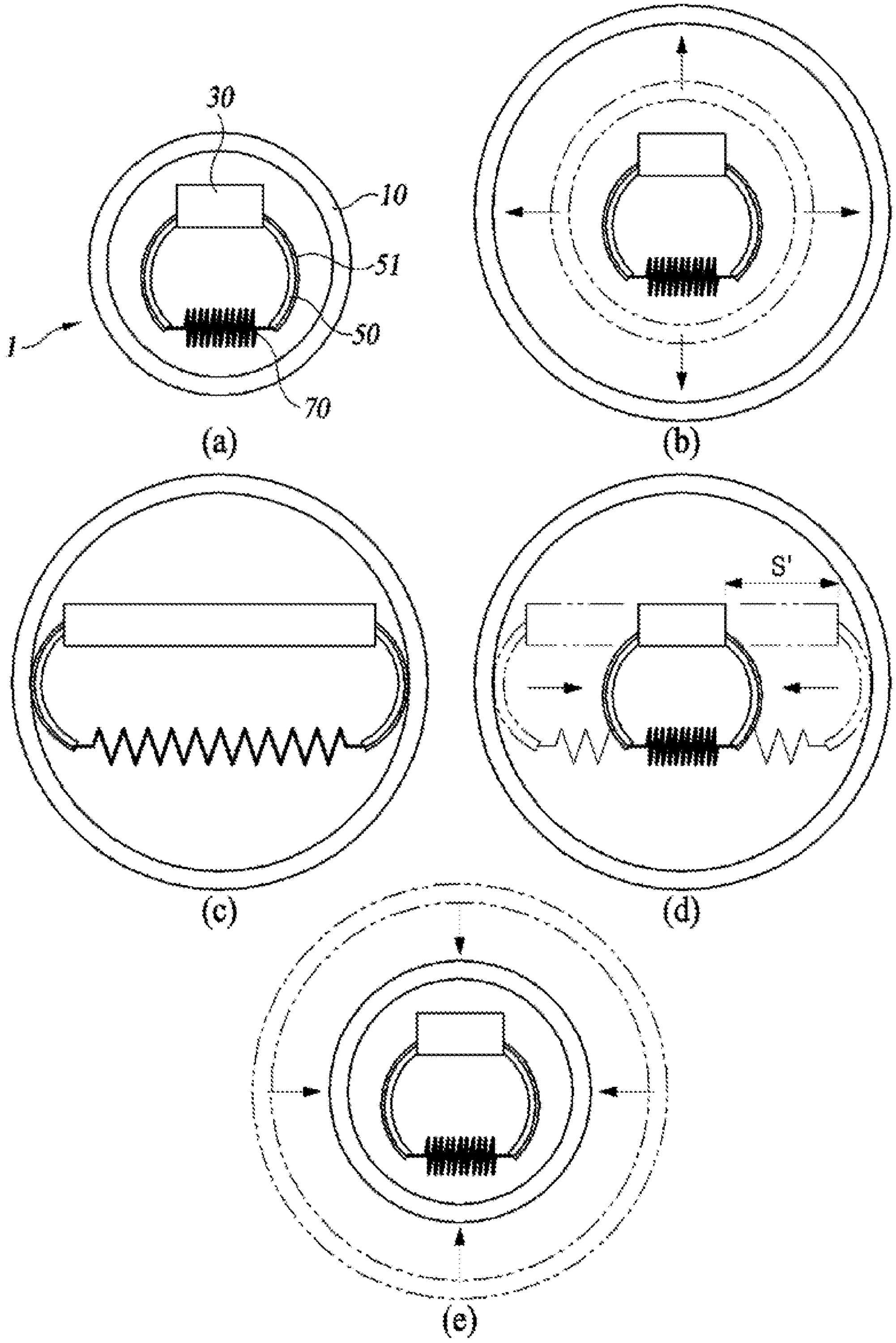
FIG. 3 is a diagram illustrating the parking engagement process and the parking release process in a state in which a drum is thermally expanded.

FIG. 3 is a diagram illustrating the parking engagement process and the parking release process in a state in which the drum is thermally expanded.

FIG. 3A shows an initial state, FIG. 3B shows a state in which the drum 10 is thermally expanded, FIG. 3C shows a state in which parking is engaged while the drum 10 is thermally expanded, FIG. 3D shows a contraction distance S' required for releasing parking when the drum 10 is thermally expanded, and FIG. 3E shows a state in which the drum 10 is cooled and contracted to its original size.

Referring to FIG. 2 and FIG. 3, the drum 10 is thermally expanded at a high temperature so that the inner diameter $d_1$ thereof becomes larger than that at room temperature. When parking is engaged in a state in which the inner diameter $d_1$ of the drum 10 is increased, the cylinder 30 expands more, and the pair of shoes 50 also has a relatively longer moving distance compared to when parking is engaged at room temperature. Therefore, when parking is released, in order for the cylinder 30 and the pair of shoes 50 to return to a state before parking engagement, the cylinder 30 should contract more (S'>S) compared to a case where parking engagement is made at room temperature, and the pair of shoes 50 also should move more. That is, because the inner diameter $d_1$ of the drum 10 becomes larger as the temperature of the drum 10 at parking engagement becomes higher, a longer contraction distance S' is required when parking is released. The higher the temperature of the drum 10 at the time of parking engagement, the control unit may delay the end time of the contraction operation of the cylinder 30 at the time of parking release. Since the contraction distance S becomes longer as the end time is delayed, the drag phenomenon does not occur when the drum 10 is cooled later.

Figure 4:
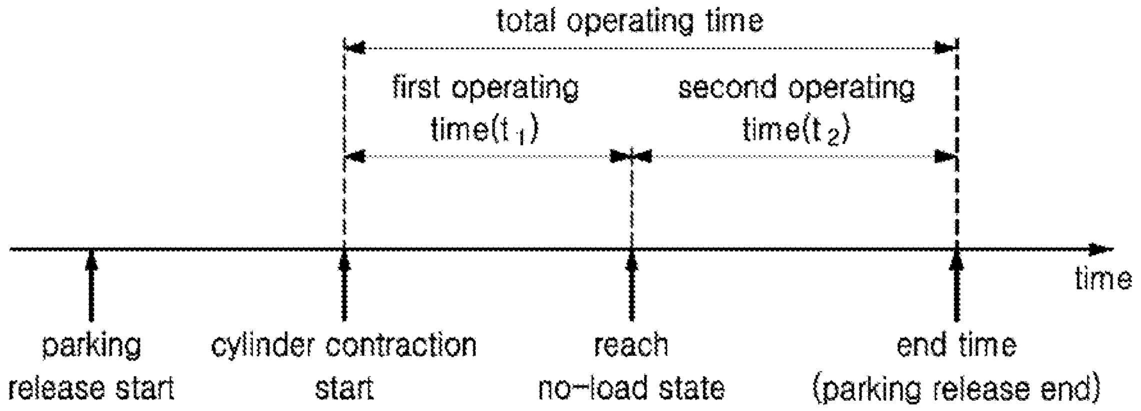
FIG. 4 is a diagram illustrating a parking release process of the electronic parking brake apparatus according to an embodiment of the present disclosure over time.

FIG. 4 is a diagram illustrating the parking release process of the electronic parking brake apparatus according to an embodiment of the present disclosure over time.

Referring to FIG. 4, a first operating time $t_1$ is the amount of time starting when the cylinder 30 begins to contract until the no-load state is reached, and a second operating time $t_2$ is the amount of time starting when the no-load state is reached until the end time is reached. The sum of the first operating time $t_1$ and the second operating time $t_2$ is the total operating time. The end time is the time at which the parking release operation of the cylinder 30 is terminated. The end time is the time at which the second operating time elapses in the no-load state.

For instance, when the second operating time $t_2$ is 2 seconds, the cylinder 30 further contracts for 2 seconds from the no-load state and then reaches the end time, so that the current supply to the motor is cut off and the parking release operation is completed.

The control unit may determine the end time based on any one or more of the temperature of the drum 10, the temperature of the motor, and the hydraulic pressure of a master cylinder M.

The control unit may delay the end time as the temperature of the drum 10 is higher, the temperature of the motor is lower, and the hydraulic pressure of the master cylinder M is higher.

If the end time is delayed, the second operating time $t_2$ becomes longer, and consequently, the contraction distance S of the cylinder 30 becomes longer. Since the pair of shoes 50 move further away from the drum 10 as the contraction distance S becomes longer, a sufficient air gap can be secured and the drag phenomenon can be prevented.

Figure 5:
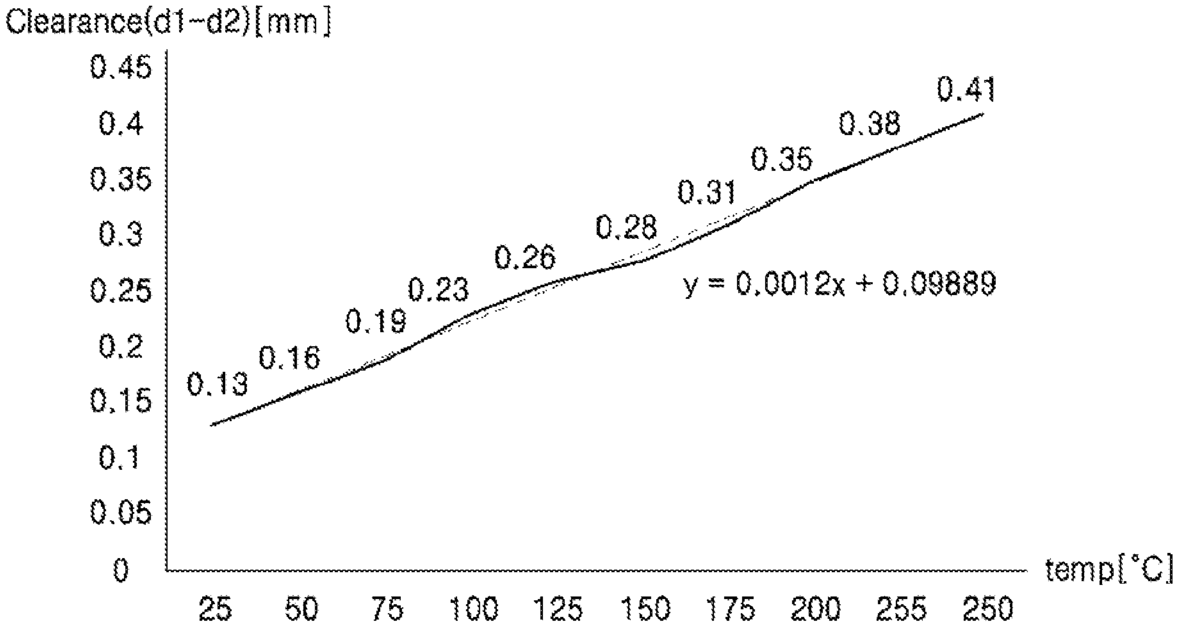
FIG. 5 is a graph illustrating a relationship between the temperature of an 8-inch drum and a clearance based on measured values, according to an embodiment of the present disclosure.

FIG. 5 is a graph illustrating a relationship between the temperature of an 8-inch drum and a clearance based on measured values, according to an embodiment of the present disclosure.

The clearance is a value obtained by subtracting the outer diameter $d_2$ of the pair of shoes 50 from the inner diameter $d_1$ of the drum 10.

Referring to FIG. 5, it can be seen that the displacement of the clearance is directly proportional to a temperature variation, and the graph of FIG. 5 is based on the measured data shown in Table 1.

TABLE 1

| Temperature (° C.) | Clearance [mm] ($d_1 - d_2$) | Drum inner diameter ($d_1$) | Shoe outer diameter ($d_2$) |
|---|---|---|---|
| 25 | 0.13 | 203.23 | 203.10 |
| 50 | 0.16 | 203.32 | 203.16 |
| 75 | 0.19 | 203.41 | 203.22 |
| 100 | 0.23 | 203.51 | 203.28 |
| 125 | 0.26 | 203.60 | 203.34 |
| 150 | 0.28 | 203.69 | 203.41 |
| 175 | 0.31 | 203.78 | 203.47 |
| 200 | 0.35 | 203.88 | 203.53 |
| 225 | 0.38 | 203.97 | 203.59 |
| 250 | 0.41 | 204.06 | 203.65 |

Based on Table 1, the relationship between the displacement of the clearance and the temperature variation is expressed as Equation 1.

$$\Delta d_{temp_{Mecha}} = C_T \times \Delta T \qquad (1)$$

In Equation 1, $\Delta d_{temp_{Mecha}}$ represents the displacement of the clearance. $C_T$ represents a temperature-displacement constant, and has the value of about 0.0012 based on the measured value. ΔT means the temperature variation.

Since the displacement of the clearance is directly proportional to the temperature variation, the displacement of the clearance according to a change in temperature may be predicted.

The greater the temperature variation, the greater the displacement of the clearance, so that the contraction distance S should be further increased when parking is released. The control unit may delay the end time of the contraction operation of the cylinder 30 as the temperature of the drum 10 is higher, and may secure a long contraction distance S as the contraction time of the cylinder 30 increases, thus preventing the drag phenomenon. Further, the control unit may predict the displacement of the clearance according to the temperature of the drum 10 to determine the required contraction distance S and determine the end time of the parking release.

Figure 6:
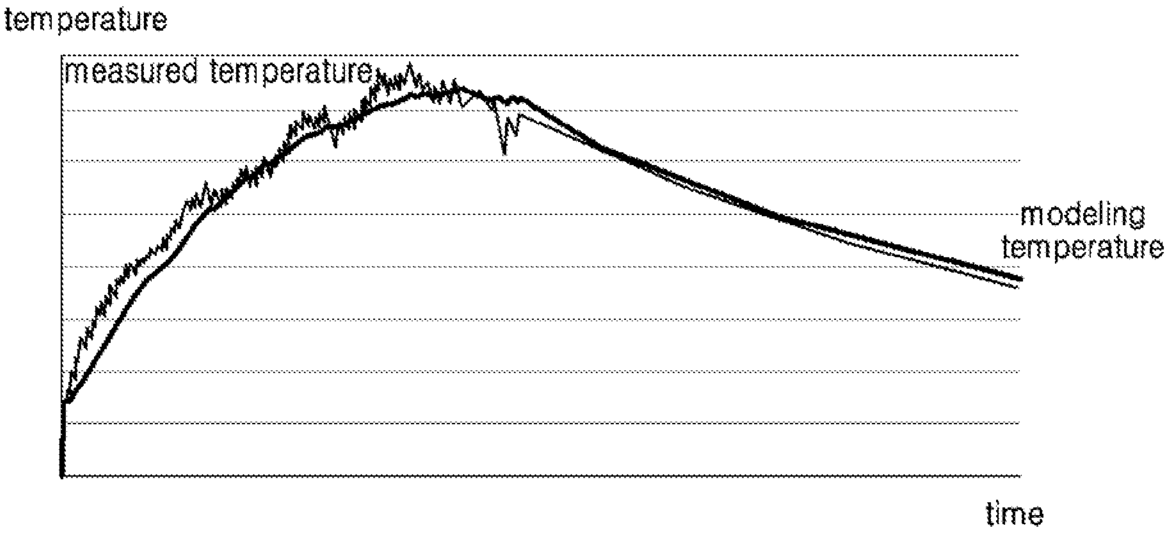
FIG. 6 is a graph comparing the measured temperature of a lining and the modeling temperature of the lining, according to an embodiment of the present disclosure.

FIG. 6 is a graph comparing the measured temperature of the lining and the modeling temperature of the lining, according to an embodiment of the present disclosure.

Referring to FIG. 6, the horizontal axis of the graph represents time, and the vertical axis represents the temperature of the lining. It can be seen that the measured temperature of the lining and the modeling temperature using modeling draw similar waveforms. The modeling temperature is derived considering driving speed, ambient temperature, brake pressure, and the like.

The lining 51 is a part that contacts the inner circumferential surface of the drum 10 to generate a frictional force, and the temperature of the drum 10 may be estimated using the temperature of the lining 51. The control unit may determine the end time of the contraction operation of the cylinder 30 based on the temperature of the lining 51.

The control unit estimates the temperature of the lining 51 and the temperature of the drum 10 using the temperature estimation model of the lining 51, and estimates the degree of expansion of the drum 10, thus determining the contraction distance S of the cylinder 30 required for parking release and the end time.

Figure 7:
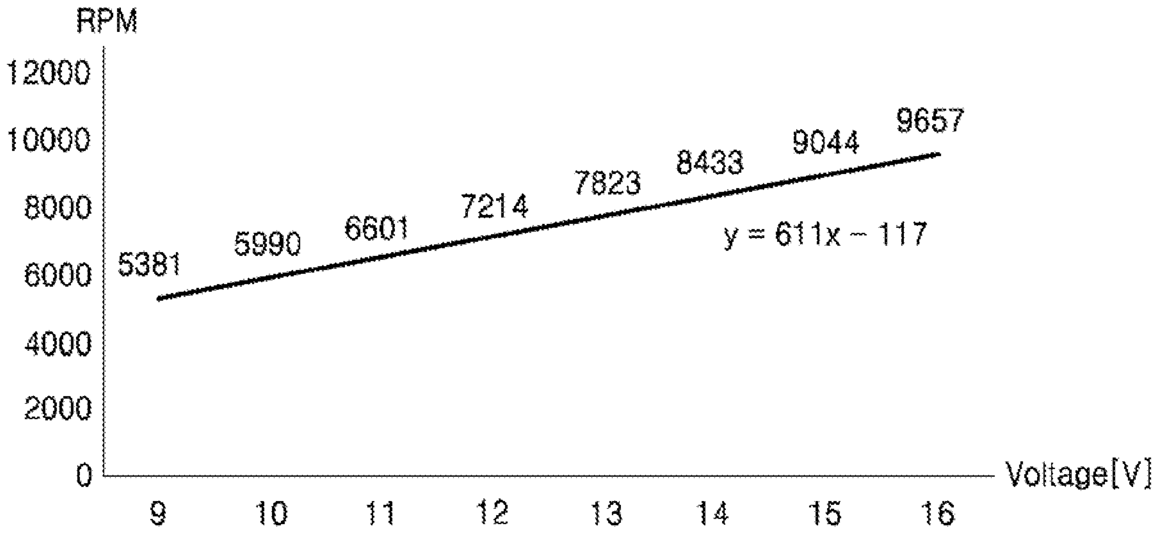
FIG. 7 is a graph illustrating a relationship between the voltage and RPM of a motor in a no-load state according to an embodiment of the present disclosure.

FIG. 7 is a graph illustrating a relationship between the voltage and RPM of the motor in the no-load state according to an embodiment of the present disclosure.

Referring to FIG. 7, the relationship between the voltage V and the RPM of the motor in the no-load state is expressed as Equation 2.

$$RPM \propto C_{RV} V \quad (2)$$

$C_{RV}$ represents a voltage-RPM relational constant. Since the RPM of the motor is proportional to the applied voltage in the no-load state, the rotation speed of the motor may be adjusted by adjusting the voltage. That is, even if the cylinder 30 contracts for the same amount of time, the contraction speed and contraction distance S of the cylinder 30 may vary depending on the voltage applied to the motor. The control unit may control the rotation speed of the motor to adjust the contraction distance S of the cylinder 30, and the control unit may control the voltage applied to the motor to adjust the contraction distance S of the cylinder 30.

The control unit may adjust to delay the end time of the contraction operation of the cylinder 30 as the temperature of the motor is lower. When the temperature of the motor is high at the time of parking release, the RPM of the motor increases and the contraction speed of the cylinder 30 increases, so that the contraction distance S of the cylinder 30 increases for the same amount of time. On the other hand, when the temperature is low, the RPM of the motor decreases and the contraction speed of the cylinder 30 slows down, so that the contraction distance S of the cylinder 30 is reduced for the same amount of time. Since the drag phenomenon may occur when the contraction distance S is reduced, the control unit may delay the end time of the contraction operation so that the contraction operation of the cylinder 30 continues for a longer time as the temperature of the motor is lower.

Since the temperature of the motor is affected by the ambient temperature, the control unit may determine the end time of the contraction operation of the cylinder 30 based on the ambient temperature when parking is released. Since the temperature of the motor is lower as the ambient temperature is lower, the control unit may delay the end time of the contraction operation of the cylinder 30 as the ambient temperature is lower.

Figure 8:
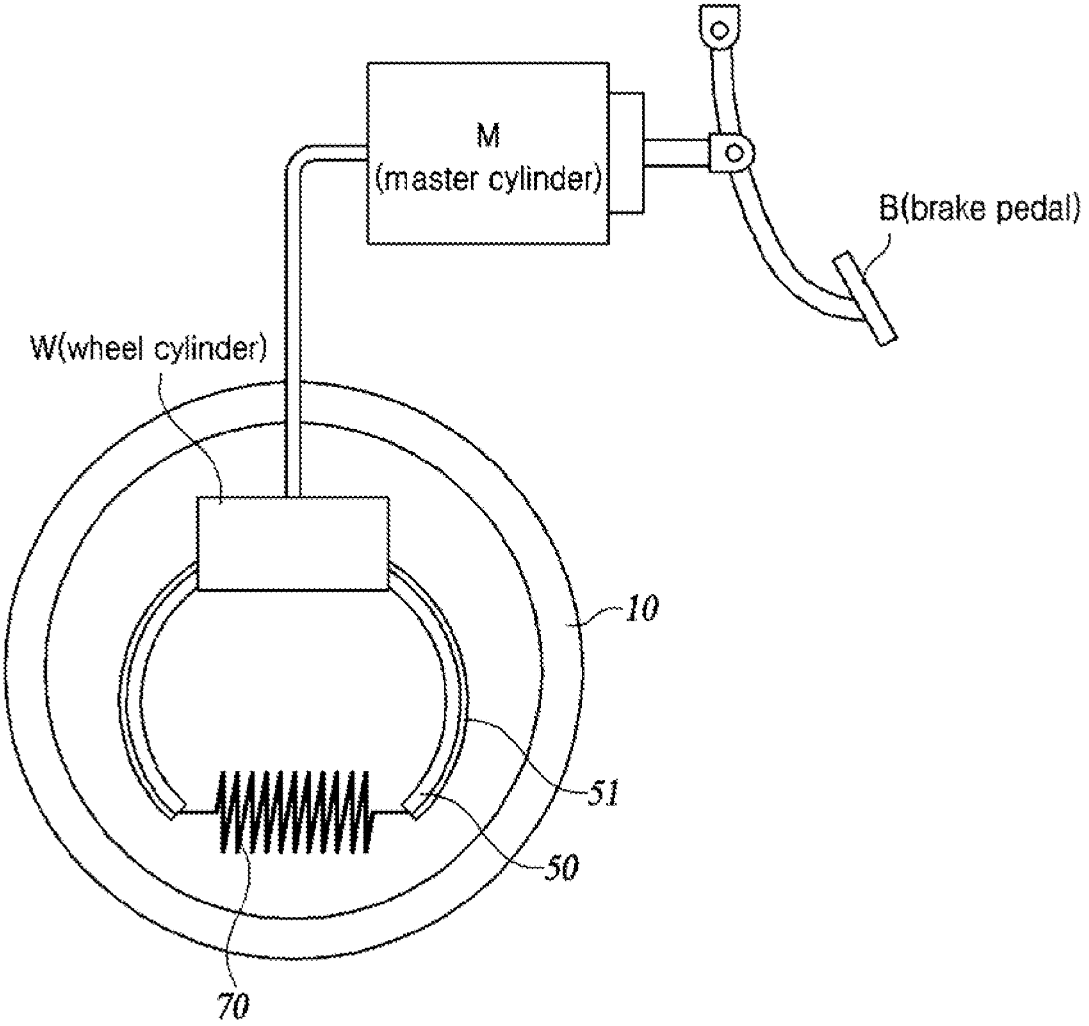
FIG. 8 is a diagram illustrating the operating principle of a hydraulic drum brake.

FIG. 8 is a diagram illustrating the operating principle of a hydraulic drum brake.

Referring to FIG. 8, in the case of the hydraulic drum 10 brake, when a driver steps on a brake pedal B, hydraulic pressure is generated in the master cylinder M, and a wheel cylinder W is expanded by the hydraulic pressure, so that the pair of shoes 50 presses the inner circumferential surface of the drum 10 to generate a braking force. When the parking engagement state of the electronic parking brake apparatus 1 is released in a state where the hydraulic pressure is generated in the master cylinder M, the time when the no-load state, which is a current inflection point, is reached is faster compared to when the brake pedal B is not depressed, and the parking release operation is also completed quickly. That is, the parking release operation may end in a state in which a sufficient air gap is not secured due to the insufficient contraction distance S of the cylinder 30. Therefore, the control unit may determine the contraction distance S and the end time of the cylinder 30 by considering the hydraulic pressure of the master cylinder M.

Table 2 is based on measured data, and shows the insufficient contraction distance $\Delta d_{press}$ (mm) of the cylinder 30 according to the hydraulic pressure of the master cylinder M.

TABLE 2

| bar | Displacement angle | avg | $\Delta d_{press}$ (mm) |
|---|---|---|---|
| 0 | 120.0 | 100% | — |
| 50 | 90.0 | 76% | 0.21 |
| 100 | 85.0 | 71% | 0.24 |

From Table 2, it can be seen that $\Delta d_{press}$ (mm) increases as the hydraulic pressure increases from 0 bar to 100 bar.

To prevent the drag phenomenon, the higher the pressure acting on the master cylinder M, the longer contraction distance S of the cylinder is required. Thus, the control unit may delay the end time of parking release as the hydraulic pressure of the master cylinder M increases. As the end time of the contraction operation of the cylinder 30 is delayed, the cylinder 30 contracts for a longer time, so that a sufficient air gap can be secured.

Figure 9:
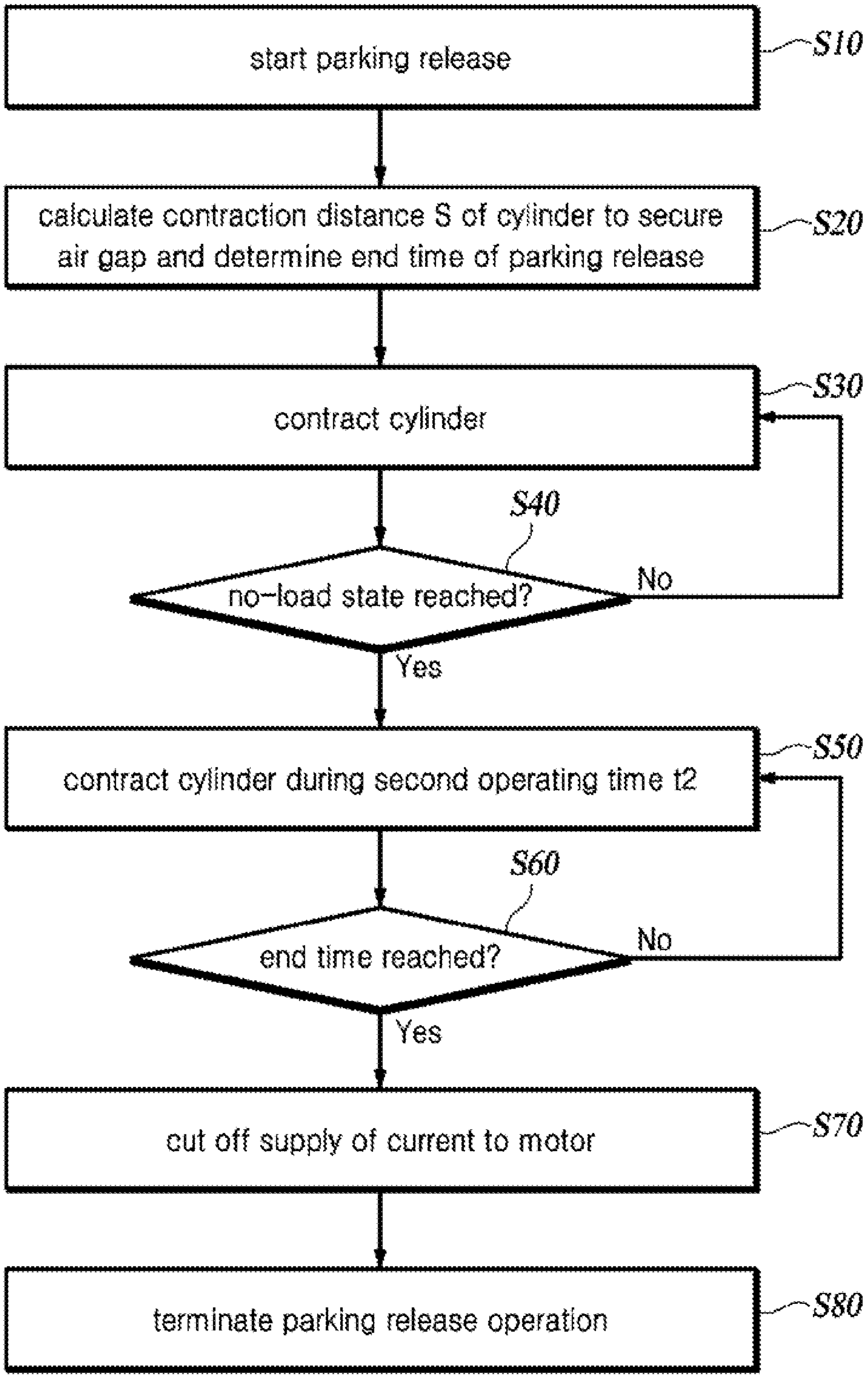
FIG. 9 is an operation flowchart of the electronic parking brake apparatus according to an embodiment of the present disclosure.

FIG. 9 is an operation flowchart of the electronic parking brake apparatus according to an embodiment of the present disclosure.

Referring to FIG. 9, the electronic parking brake apparatus 1 according to an embodiment of the present disclosure receives a parking release signal to start parking release (S10).

When parking release starts, the control unit calculates the contraction distance S of the cylinder 30 to secure a sufficient air gap and determines the end time of parking release (S20). The control unit may determine the contraction distance S of the cylinder 30 and the end time of parking release based on any one or more of the temperature of the drum, the temperature of the motor, and the hydraulic pressure of the master cylinder.

The cylinder 30 contracts until the no-load state is reached (S30). While the cylinder 30 is contracting, the pair of shoes 50 contacting the inner circumferential surface of the drum 10 is pulled toward the cylinder 30.

The control unit determines whether the cylinder 30 contracts and reaches the no-load state (S40). Since the current passes through an inflection point when the pair of shoes and the drum change from the contact state to the non-contact state, the control unit determines that the no-load state has been reached when the current passes through the inflection point.

After reaching the no-load state, the cylinder 30 contracts until the end time is reached, and contracts during the second operating time $t_2$ calculated by the control unit (S50).

The control unit determines whether the cylinder 30 contracts during the second operating time $t_2$ and reaches the parking release end time (S60).

When the parking release end time is reached, the control unit cuts off the supply of current to the motor (S70).

When the supply of current to the motor is cut off, the cylinder 30 stops contracting, and the electronic parking brake apparatus 1 ends the parking release operation (S80).

Referring to FIG. 9, step S20 is illustrated as being performed between steps S10 and S30, but step S20 may be performed at any point in time. The present disclosure is not necessarily limited to FIG. 9. When the parking engagement is made at a high temperature, step S20 may be performed even immediately after the parking engagement. For instance, the control unit may determine the contraction distance S and the end time in consideration of the temperature of the drum 10 at the time of parking engagement. Parking release may be performed by applying the previously determined contraction distance S and end time at the time of parking release.

The control unit may determine the contraction distance S and the end time by comprehensively considering various factors. For instance, the control unit may determine the end time of the contraction operation of the cylinder 30 based on any one of the temperature of the drum 10, the temperature of the motor, and the hydraulic pressure of the master cylinder M.

Since the inner diameter $d_1$ of the drum 10 increases as the temperature of the drum 10 increases, a longer contraction distance S is required at the time of parking release if the parking engagement is made in a state where the drum 10 is at high temperature. In this case, the control unit may control the contraction distance S by determining the end time so that the contraction operation of the cylinder 30 is performed for a longer period of time so as to increase the contraction distance S.

Since the rotation speed of the motor decreases as the temperature of the motor decreases, the cylinder 30 has a shorter contraction distance S even if it contracts for the same amount of time. In this case, the control unit may control the contraction distance S by determining the end time so that the contraction operation of the cylinder 30 is performed for a longer period of time so as to increase the contraction distance S.

The higher the hydraulic pressure of the master cylinder M, the faster the no-load state is reached, so that a longer contraction distance S is required when parking is released. In this case, the control unit may control the contraction distance S by determining the end time so that the contraction operation of the cylinder 30 is performed for a longer period of time so as to increase the contraction distance S.

Further, the control unit may control the rotation speed of the motor to adjust the contraction distance S of the cylinder 30. When the rotation speed of the motor increases, the distance that the cylinder 30 contracts during the same amount of time increases. When a long contraction distance S of the cylinder 30 is required at the time of parking release, such as when the drum 10 expands due to high temperature or when the hydraulic pressure of the master cylinder M is applied, the control unit may control the rotation speed of the motor, thus preventing the drag phenomenon.

Although exemplary embodiments of the present disclosure have been described for illustrative purposes, those having ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of the ordinary skilled would understand that the scope of the claimed invention is not to be limited by the above explicitly described embodiments but by the claims and equivalents thereof.

What is claimed is:

1. An electronic parking brake apparatus for a vehicle, comprising:

a drum;

a backing plate disposed within the drum;

a cylinder attached to a surface of the backing plate;

a motor configured to expand or contract the cylinder;

a pair of brake shoes respectively coupled to first and second sides of the cylinder;

a lining attached to an outer circumferential surface of each brake shoe;

a spring coupled between the pair of brake shoes; and a control unit configured to control a contraction operation of the cylinder when a parking brake of the vehicle is released, wherein the control unit is configured to determine, based on a temperature of the motor or a hydraulic pressure of a master cylinder of the vehicle, an end time of the contraction operation of the cylinder in order to control contraction of the cylinder, and wherein the control unit is configured to delay the end time of the contraction operation when a temperature of the drum is higher than a first predetermined temperature, the temperature of the motor is lower than a second predetermined temperature, and the hydraulic pressure of the master cylinder is higher than a predetermined pressure.

2. The electronic parking brake apparatus of claim 1, wherein the control unit is configured to determine the end time of the contraction operation based on a temperature of the lining.

3. The electronic parking brake apparatus of claim 1, wherein the control unit is configured to determine the end time of the contraction operation based on an ambient temperature.

4. The electronic parking brake apparatus of claim 1, wherein the control unit is configured to control a rotation speed of the motor to adjust a contraction distance of the cylinder.

* * * * *